United States Patent [19]

Blincoe et al.

[11] 4,313,364
[45] Feb. 2, 1982

[54] DUAL CYLINDER LINEAR SERVO MOTOR

[75] Inventors: Richard A. Blincoe, Portage, Mich.; Louis C. Hrusch, Chesterland, Ohio

[73] Assignee: Pneumo Corporation, Boston, Mass.

[21] Appl. No.: 45,425

[22] Filed: Jun. 4, 1979

[51] Int. Cl.³ .................. F01L 33/02; F01B 15/04; F15B 13/16
[52] U.S. Cl. .................. 91/176; 91/180; 91/210; 91/361; 91/451
[58] Field of Search .................. 91/180, 176, 210

[56] References Cited

U.S. PATENT DOCUMENTS

| | | | |
|---|---|---|---|
| 381,678 | 4/1888 | Brisey | 91/180 |
| 1,530,881 | 3/1925 | Burks | 91/180 |
| 1,989,212 | 1/1935 | Pascolini | 91/180 |
| 3,090,362 | 5/1963 | Rolls | 91/176 |
| 3,129,644 | 4/1964 | Anderson | 91/180 |
| 3,182,455 | 5/1965 | Racicot | 91/180 |
| 3,220,316 | 11/1965 | Kummermon | 91/176 |
| 3,696,710 | 10/1972 | Prtelli | 91/180 |

FOREIGN PATENT DOCUMENTS 514237 11/1920 France .................. 91/176

Primary Examiner—Paul E. Maslousky
Attorney, Agent, or Firm—Maky, Renner, Otto & Boisselle

[57] ABSTRACT

Servoactuator includes a pair of double-acting linear actuators providing for 360° controlled rotation of an output shaft. The rotary motion of the ouput shaft is employed to sequence high pressure fluid flow and return for the same to the respective ends of the respective actuators so that both actuators continuously develop output force except for end stroke points. Shimmy damping may also be obtained by a bypass-damping valve which comprises a shuttle movable to a first position by high pressure fluid for controlled operation of the servoactuator and to a second position by removal of the high pressure fluid to direct fluid flow between the respective actuators through a damping orifice.

26 Claims, 9 Drawing Figures

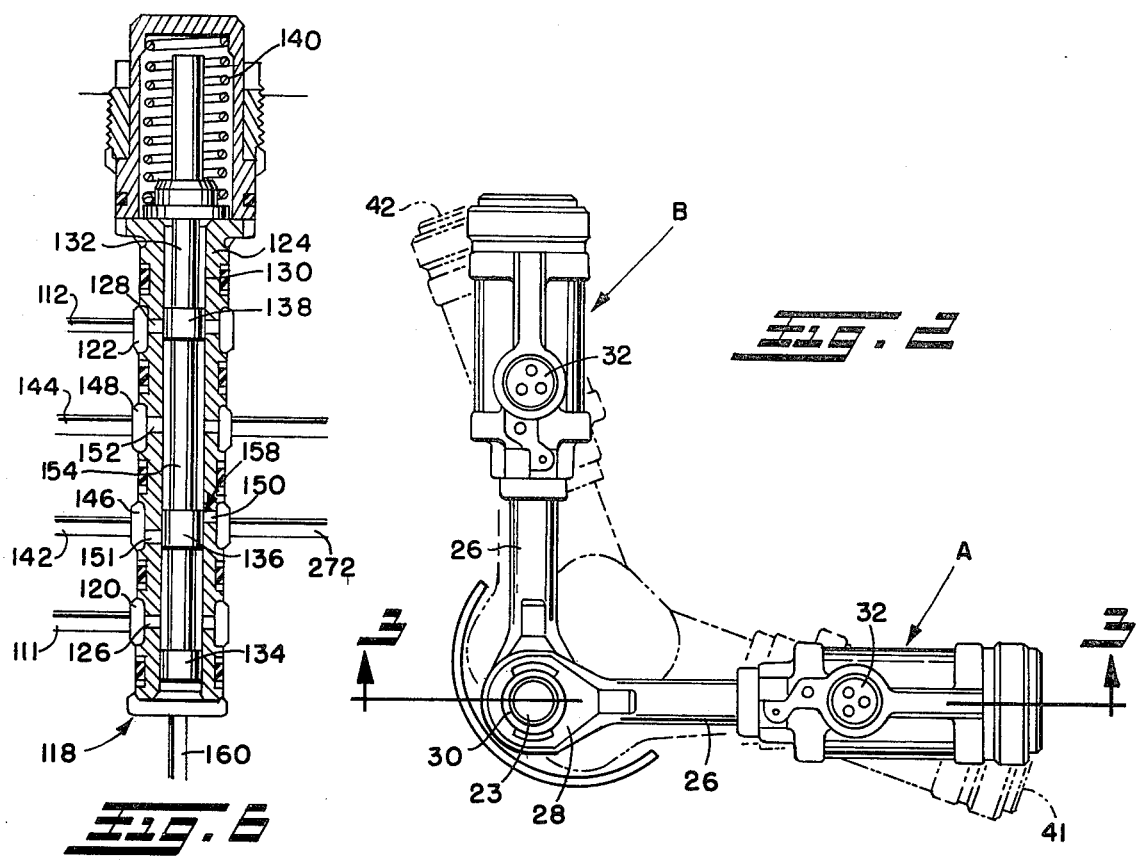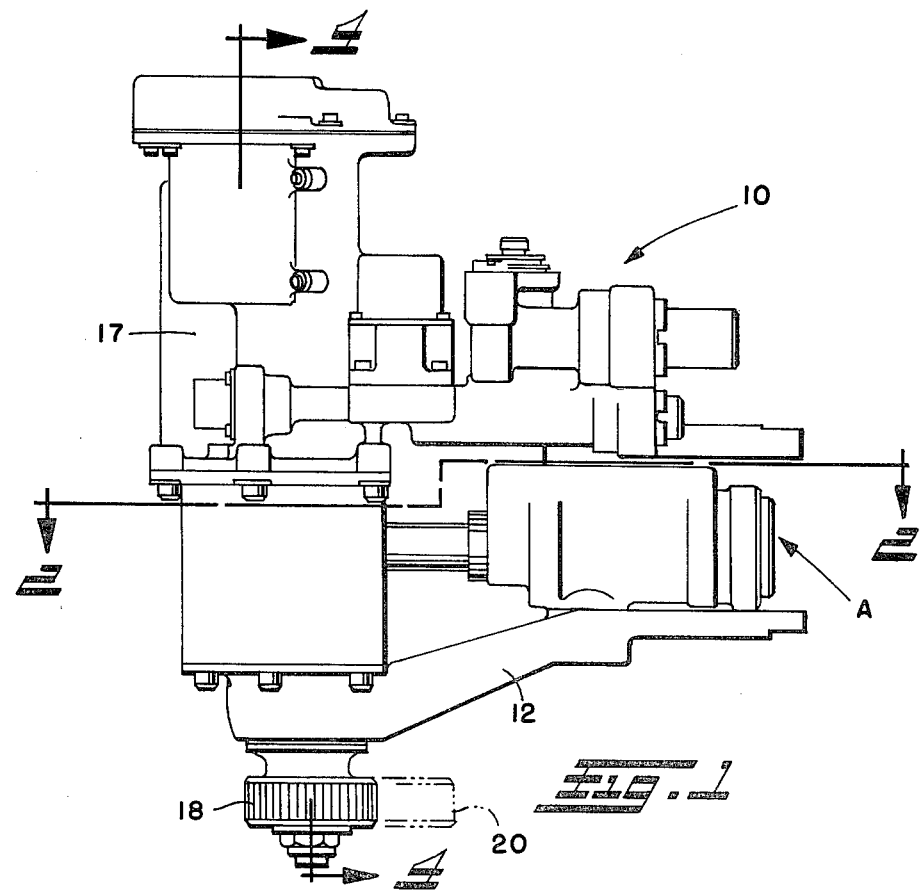

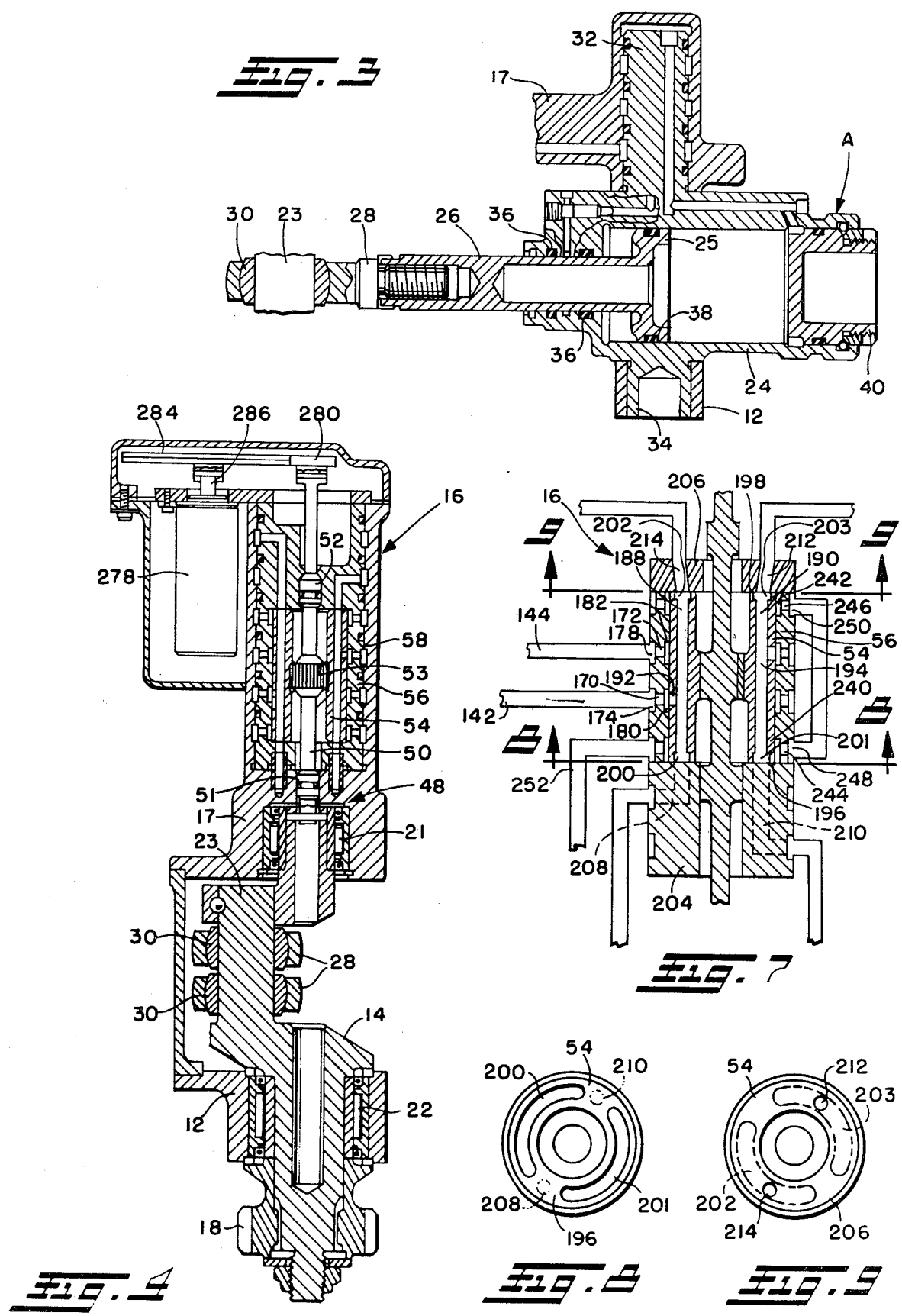

DUAL CYLINDER LINEAR SERVO MOTOR

BACKGROUND OF THE INVENTION

This invention relates generally to a low speed, high torque servoactuator and more particularly to a servoactuator that provides for 360° controlled operation especially adapted for aircraft nose wheel steering systems and the like.

Conventional aircraft steering systems requiring 360° of motion are either equipped with a disconnect from the steering motor to the strut assembly, or use high speed hydraulic motors suitably down geared to develop the proper torque output at the required low servo speeds. Such systems have been found to be undesirable for several reasons. With regard to the former, such systems require the undesirable disconnect feature, and as to the latter, such systems require a plurality of high speed rotating parts with attendant wear characteristics. In either case, such systems have been found to have a relatively low power to weight ratio which is undesirable in modern aircraft in which size and weight are important factors.

Other systems have been known to utilize fluid actuators but have required complex pressure actuation to achieve desirable performance characteristics, such as shown and described in U.S. Pat. No. 3,124,043.

SUMMARY OF THE INVENTION

With the foregoing in mind, it is a principal object of this invention to provide a servoactuator with excellent low speed servo control characteristics.

Another object is to provide such a servoactuator with continuous rotary output.

Still another object is to provide such a servoactuator with constant power while operating under constant load and speed conditions.

Yet another object is to provide a light weight servoactuator constructed of simple and reliable components that provides for improvement in developed power to weight ratio over conventional motor-gear approaches.

A further object is to provide such a servoactuator which does not require high speed rotating parts and attendant wear characteristics, and in which the number of rotating parts is also reduced.

Still a further object is to provide a servoactuator in which the overall manufacturing cost and complexity is reduced.

Yet another object is to provide a servoactuator system for an aircraft nose wheel system with 360° controlled operation and capable of 360° swivelling without disconnect.

Still yet another object is to provide such a servoactuator system that may be actuated by electro-hydraulic controls with electrical position feedback, or used with mechanical input-mechanical feedback control mechanisms.

An additional object is to provide such a servoactuator system including shimmy damping when the system is in a power-off mode.

These and other objects of the present invention may be achieved utilizing a servoactuator employing two double-acting linear actuators for driving a crankshaft such that the force output of each actuator is summed on the crankshaft. The rotary motion of the output pinion is employed to drive a motoring valve which sequentially connects a source of high pressure fluid and return for the same to the respective ends of the respective actuators so that both actuators continuously develop output force, except for the stroke end points. The speed of the servoactuator is directly proportional to fluid flow which may be controlled by a linear electro-hydraulic valve. The device when equipped with a position feedback transducer in a position control servo system provides precise position control over a high torque range, with excellent low speed servo control characteristics.

In accordance with another aspect of the invention, shimmy damping may be obtained in a power-off mode, such as may occur when selected by the pilot, by providing a bypass-damping valve which is connected in line between the source and return for high pressure fluid. In such power-off mode, the valve is biased to direct fluid flow between the respective actuators through a damping orifice. When the system is energized, or in the power-on mode, the valve is shuttled to block such fluid flow between the respective actuators and to connect the high pressure fluid source and return to the motoring valve for controlled operation of the system.

To the accomplishment of the foregoing and related ends the invention, then, comprises the features hereinafter fully described and particularly pointed out in the claims, the following description and the annexed drawings setting forth in detail a certain embodiment of the invention, this being indicative, however, of but one of the various ways in which the principles of the invention may be employed.

BRIEF DESCRIPTION OF THE DRAWINGS

In the annexed drawings:

FIG. 1 is a side elevation view of a preferred form of servoactuator system in accordance with the present invention;

FIG. 2 is a top plan view of the two actuators included in the servoactuator system of FIG. 1 with the manifold and motoring valve removed, as seen from the plane of the line 2—2 thereof, illustrating the angular relationship and pivoted movement of such actuators;

FIG. 3 is an enlarged longitudinal section through one of the actuators of FIG. 2, taken along the line 3—3 thereof;

FIG. 4 is an enlarged longitudinal section through the servoactuator of FIG. 1, taken along the line 4—4 thereof illustrating the relationship between the crankshaft and motoring valve;

FIG. 6 is an enlarged view of the bypass-damping valve depicted in FIG. 5;

FIG. 7 is an enlarged view of the motoring valve depicted in FIG. 5; and

FIGS. 8 and 9 are transverse sections through the motoring valve of FIG. 7 respectively taken along the lines 8—8 and 9—9 thereof illustrating the relationship between the rotating sleeve arcuate ports and stationary end ports at an instantaneous position.

DESCRIPTION OF THE PREFERRED EMBODIMENT

Figure 5:
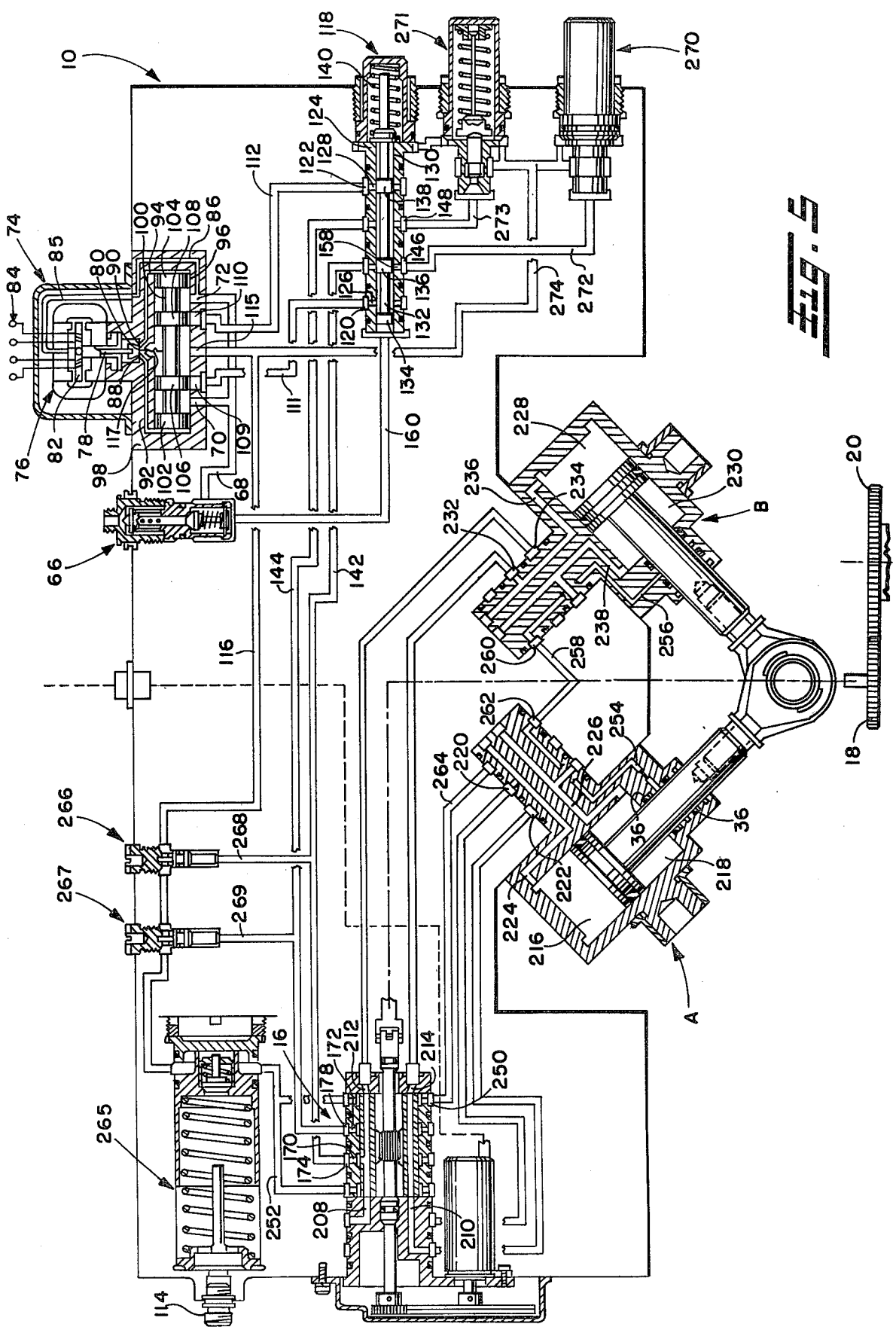
FIG. 5 is a schematic diagram of the servoactuator system of FIG. 1 to illustrate more clearly the manner in which the various components of the system are operatively connected together.

Referring now in greater detail to the drawings and initially to FIGS. 1 through 4, there is shown a preferred form of servoactuator system 10 constructed in accordance with the present invention including a housing 12 on which are pivotally mounted a pair of actuators A and B adapted to drive a crankshaft 14. Rotary motion of the crankshaft 14 is employed to drive a motoring valve 16 housed in a manifold 17 mounted on the housing 12. The motoring valve 16 sequences the flow of high pressure fluid to and from actuators A and B to effect rotation of the crankshaft 14 in a manner to be subsequently described. Mounted on one end of the crankshaft 14 for rotation therewith is a pinion gear 18 which drives the torque collar gear 20 of an aircraft nose wheel strut (not shown). Crankshaft 14 is suitably journaled for rotation between bearings 21 and 22 in the housing 12, and includes crank or arm 23 to which actuators A and B are connected as best shown in FIGS. 2 and 4. Although the servoactuator system of the present invention is described and shown in conjunction with an aircraft nose wheel steering system, it will be appreciated that the system may be used in other applications where precise low speed, high torque servo-positioned output is required, for example, in radar antennae drive controls, missile engine gimbal power actuation, and gun positioning power controls and the like.

Actuators A and B are preferably of identical construction, and accordingly only one of the actuators A is shown in section in FIG. 3. Each such actuator comprises an actuator cylinder 24 in which is reciprocally mounted piston 25 and rod 26. A rod end 28 is secured to the rod 26 and includes a rotatable ball 30 adapted for connection to the crankshaft 14 (see FIG. 4). The actuators A and B are trunnion mounted for rotation about a pair of fixed trunnions 32, 34, one of which may contain internal porting as will be described more fully below. Suitable rod seals 36 and a piston seal 38 may be provided, as well as an end retainer 40 at the outer ends of the cylinders 24 to facilitate removal of the piston for replacement of the various seals when worn without removing the cylinders from the assembly.

As best seen in FIG. 2, actuators A and B are angularly arranged preferably at an angle of about 90°. During actuation of the actuators, each will pivot about their respective trunnions 32, 34 as shown in phantom to effect rotation of crank 23.

Connected to the crankshaft 14 as by a universal joint 48 is the valve shaft 50 of the motoring valve 16 which is suitably journalled between bearings 51 and 52 mounted in the manifold 17. The valve shaft 50 has an intermediate gear 53 mounted thereon which drives a rotary sleeve 54. Surrounding the rotary sleeve 54 is a stationary sleeve 56 which is received in a bore 58 in manifold 17.

For a more complete understanding of the details of construction and operation of the actuator system 10, reference may be had to FIG. 5, which schematically shows the various components of the system and the manner in which they are interconnected together.

Preferably, the porting between the various components is integrally contained in manifold 17 mounted on housing 12. The system 10 has an inlet filter and check valve assembly 66 for connection with a source of high pressure hydraulic fluid. Conduit 68 leads from the inlet valve assembly to pressure ports 70 and 72 of an electrohydraulic valve (EH valve) 74 which may be of the dual-coil, dual-stage type shown. The first stage is an electro-hydraulic preamplifier comprised of a torque motor 76, jet pipe 78 and receiver 80. The torque motor 76 is conventional and comprises a rotatably mounted armature 82 which is pivoted in well known manner by a control signal from an electrical signal-producing means connected to terminal ends 84. The jet pipe 78 is rigidly attached to the armature 82 for rotation therewith. A very small flow of high pressure fluid is supplied to the jet pipe by a flexible tube 85 which communicates with the conduit 68 via passage 86. Accordingly, high pressure fluid will exit the jet pipe and impinge upon the face of the receiver 80 which is provided with two small diameter holes 88 and 90 located side by side in the receiver.

The holes 88 and 90 communicate via passages 92 and 94 respectively with opposite ends of bore 96 formed in the valve housing 98 in which valve spool 100 is disposed for axial movement therein. Spool 100 has opposite end lands 102 and 104, and associated intermediate lands 106 and 108. When in its null position, the lands 106 and 108 block communication between pressure ports 70 and 72 and ports 109 and 110 which communicate with passages 111 and 112, respectively. However, when the spool is on either side of null, high pressure fluid will be supplied to one of the passages 111 or 112, while the other passage will be connected to the system return via central port 115, passage 116 and return port 114.

When a signal is impressed on the torque motor 76 the resultant torque causes the jet pipe 78 to rotate off center and a pressure unbalance occurs across the spool 100 causing it to move. A feedback spring 117 acts on the spool 100 tending to retain the spool in its null or centered position. As the spool displaces from null it deflects the feedback spring 117 developing a force counter to the input torque, causing the spool to come to rest in a new position whereat the spring force counterbalances the pressure unbalance created by the jet pipe movement.

Spool displacement is thus proportional to the torque input. For practical purposes a linear relationship exists between torque and input current and between spool displacement and flow. Therefore, second stage flow will be proportional to the input current signal.

The jet pipe design is inherently insensitive to contamination due to relatively large internal flow passages as compared to nozzle-flapper-type valves. Moreover, if plugging by contamination were to occur, it would cause a degradation of performance but not a catastrophic "hardover" failure. The EH valve 74 is also less sensitive to erosion effects of small, hard particles in the fluid because the height of the jet pipe over the receiver is not critical.

Conduits 111 and 112 lead from the EH valve 74 to a bypass-damping valve 118 and are connected to annular grooves 120 and 122 in sleeve 124 of valve 118 which in turn communicate via ports 126 and 128, respectively, with the bore 130 as best seen in FIG. 6. Longitudinally shiftable within the bore 130 is a spool 132 which has lands 134, 136 and 138, and is spring biased by spring 140 to the left as shown in FIG. 5 or downwardly as shown in FIG. 6. In this position, passages 142 and 144 which supply flow to the motoring valve 16 are interconnected via annular grooves 146, 148 and ports 150, 152 by reduced portion 154 between lands 136 and 138. The land 136 underlaps port 150 thus providing a damping orifice 158 communicating with annular groove 146.

The left or lowermost end of the bore 130 is connected to the inlet valve assembly 66 via conduit 160, whereby when high pressure fluid is supplied to the system, the supply pressure overcomes the spring 140 force and shuttles the spool 132 to the right thereby providing communication between ports 126 and 151 (communicating with annular groove 146) and 128 and 152, respectively, such communication previously being blocked by lands 136 and 138.

Passages 142 and 144 supply high pressure fluid and return for the same to the inlet ports 170 and 172 in stationary sleeve 56 of motoring valve 16 via annular grooves 174 and 178 of the motoring valve as best shown in FIG. 7. Fluid is ported through ports 170 and 172 to inner annular grooves 180 and 182 providing communication with longitudinal ports 188 and 190, respectively, in the rotary sleeve 54 via transverse ports 192 and 194.

As best seen in FIGS. 8 and 9, the opposite ends 196 and 198 of the rotary sleeve 54 are provided with arcuate porting channels 200, 201 and 202, 203, respectively, into which the longitudinal ports 188 and 190 respectively open. Adjacent each end of the rotary sleeve are porting plates 204 and 206 which include static ports 208, 210 and 212, 214, respectively, communicating with respective ends of actuators A and B. Rotation of the rotary sleeve sequentially directs flow from the longitudinal ports 188 and 190 into the static ports 208, 210 and 214, 212 for extension and retraction of the actuators as described below.

Static ports 208 and 210 communicate with extend and retract cavities 216 and 218 of actuator A via annular grooves 220, 222 and passages 224, 226, while static ports 214 and 212 communicate with extend and retract cavities 228 and 230 of actuator B via annular grooves 232, 234 and passages 236, 238 as shown in FIG. 5.

Any internal leakage that might occur at each end of the rotary sleeve 54 may be ported to return 114 via annular grooves 240, 242, ports 244, 246, and outer annular grooves 248, 250 which are connected to passage 252 leading to the return 114. Any fluid between rod seals 36 may also be ported to return 114 via passages 254 and 256 in the actuators. Passage 258 connects passages 256 via annular grooves 260 and 262 to passage 264 which leads to annular groove 250 in the outer sleeve of the motoring valve as further shown in FIG. 5.

The system is also preferably provided with a conventional fluid compensator 265, shown in FIG. 5, to maintain sufficient head to provide make-up fluid to the system as needed during contraction of the same due to temperature decrease during power-off operation. The compensator is charged in the power-on mode by flow from the passages 116 and 252 through the compensator to the return port 114, with the compensator piston being displaced against spring pressure until the relief valve is mechanically opened by the fixed bottoming plunger. Such operation develops an internal return pressure or head in the system above the external return pressure at return port 114. In the power-off mode, the internal return pressure decays as the fluid contained in the compensator is returned to the system via passages 116 and 252 to make up for the fluid contraction in the system due to temperature decrease.

In addition, conventional anti-cavitation valves 266, 267, schematically illustrated, are provided to insure against cavitation and are connected to passages 142 and 144 via passages 268 and 269, respectively. In the event of a negative pressure differential between passage 116 and passage 142, for example, the higher pressure in passage 116 will unseat the poppet of valve 266 to permit flow from passage 116 to passage 142 thereby to prevent cavitation in the latter. A positive pressure differential reseats the poppet thus preventing reverse flow from passage 142 to passage 116.

There may also be provided pressure relief valves 270 and 271 which direct cylinder flow to return during any possible extreme backdriving condition. The valves 270 and 271 are connected to passages 142 and 144 via passages 272 and 273 and annular grooves 146 and 148 of bypass damping valve 118. Return flow from the pressure relief valves 270 and 271 is provided by passages 274 connected to passage 116.

A rotary variable differential transformer 278, schematically shown in FIG. 4, may be incorporated to provide electrical feedback position signals proportional to the angular position of the crankshaft. The feedback transformer may be driven by a pinion gear 280 secured to the top of the motoring valve shaft 50 which engages an anti-backlash gear 284 secured to the shaft 286 of the transformer 278. The signals may be fed back to a steering control computer.

In operation of the system 10, high pressure fluid is supplied to inlet filter and check valve assembly 66 in a power-on mode. High pressure fluid acts through passage 68 and ports 70 and 72 to balance the spool 100 of EH valve 74. Fluid is also provided via passage 86 to the jet pipe 78 and impinges upon the face of the receiver 80. With the jet pipe centered over the two holes 88, 90 in its null position, equal pressures are developed on either end of the spool 100.

EH valve 74 may then be energized for rotating the jet pipe 78 off center toward either of the orifices 88 or 90. Shifting jet pipe to the left as seen in FIG. 5 will increase the pressure acting through the passage 92 against the left end of the spool 100. This will cause the spool to shift to the right opening port 109 to communication with pressure port 70 between lands 102 and 106. Port 110 will be opened to communication with return port 115 between lands 106 and 108. High pressure hydraulic fluid will then flow from pressure port 70 through port 109 to passage 111, while at the same time hydraulic fluid will be exhausted through passages 112, and ports 110 and 115 through passage 116 to return port 114.

As indicated previously, as the spool 100 displaces from null, it deflects the feedback spring 117 developing a force on the spool 100 counter to the input torque, causing the spool to come to rest in a new position at which the spring force counterbalances the pressure unbalance created by the jet pipe.

In the power-on mode, high pressure fluid is also supplied to the left end of bypass damping valve 118 by passage 160, thereby shifting the spool 132 to the right as shown in FIG. 5 or upwardly as shown in FIG. 6. In such position, fluid communication exists between passages 111 and 142 and passages 112 and 144. Accordingly, the pressure differential across inlet ports 170 and 172 of the motoring valve 16 is directly responsive to the EH valve 74.

Fluid entering the inlet ports 170 and 172 is ported through the stationary outer sleeve 56 of the motoring valve 16 and into the rotary porting member 54. The arcuate porting channels 200, 201 and 202, 203 at either end direct the flow into the static ports 208, 210 and 214, 212 which in turn supply fluid to actuators A and B in the manner previously described.

Clockwise rotation of the servoactuator is accomplished when the load pressure is greater in passage 142 than in passage 144, which occurs when the spool 100 is shifted to the right as viewed in FIG. 5. The porting member 54 provides properly sequenced fluid flow through the motoring valve 16 from passages 142 and 144 to the fixed end port plates 204 and 206 through internal porting at the actuator swivels 32, 34 to each actuator. As the actuators drive the crankshaft 14, the center porting member 54 is driven thereby maintaining a constant relationship to output position of the dual linear motor. The arcuate channels are arranged in angular relationship to the specific position of the linear actuator being driven. The valve porting is overlapped in the cylinder end switchover region to eliminate a transient cross flow. Valve internal leakage to return in the overlapped region accommodates the hydraulic switchover pressure transient.

It will now be appreciated that the potential maximum developed torque output of the servoactuator, with a constant pressure drop across the input cylinder lines is nonlinear with output rotation. However, the required motor flow, or sum of the actuator displacements is also nonlinear with speed held constant. These nonlinearities, which are a function of the sinusoidal relationship of each of the linear actuators displacement, are complementary. Moreover, maximum flow demand is occurring coincident with minimum load pressure demand, whereby when driving under constant load at a constant rate, the required power is essentially constant.

In the power off mode, or when no high pressure hydraulic fluid is supplied to the system such as may occur during selected power off landing roll, there is provided shimmy damping through bypass damping valve 118. When no pressure is supplied to the system, bypass damping valve spool 132 is biased to the left thus directing actuator cylinder flow through the damping orifice 158 of the valve. Accordingly, as the aircraft is slowed in the landing roll, with no hydraulics applied to the steering system, any shimmy tendency will be sufficiently damped. Moreover, it will be appreciated that the bypass damping valve sleeve 124 may be changed as desired to provide a variety of different damping characteristics.

In either the power on or power off modes, the high pressure relief valves 270 and 271 are connected to the actuators for directing flow to return in the event that the design pressure differential within the system is exceeded.

Although the invention has been shown and described with respect to a certain preferred embodiment, it is obvious that equivalent alterations and modifications will occur to others skilled in the art upon the reading and understanding of the specification. The present invention includes all such equivalent alterations and modifications and is limited only by the scope of the claims.

The embodiments of the invention in which an exclusive property or privilege is claimed are defined as follows:

1. A servoactuator for controlled rotation of a crankshaft and the like comprising a plurality of angularly disposed actuators, means operatively connecting said actuators to a shaft for effecting rotation of such shaft in response to reciprocating movements of said actuators, and means for sequencing a source of high pressure fluid and return to the respective ends of said actuators so that said actuators continuously develop output force except for end stroke points, said means for sequencing comprising valve means driven by the rotary motion of such shaft, said valve means comprising a rotatable sleeve having arcuate channels at each end respectively communicating with a source of high pressure fluid and return, and static ports adjacent each end of said rotatable sleeve which sequentially communicate with said arcuate channels as said rotatable sleeve rotates thereby sequencing high pressure fluid and return to the respective ends of said actuators.

2. The servoactuator of claim 1 wherein said valve means sequences the flow of fluid to and from two of said actuators, there being a pair of said arcuate channels at each end of said rotatable sleeve, and a pair of said static ports adjacent each end of said rotatable sleeve, one of said static ports at each end being connected to the extend port of one of said actuators and the other of said static ports at each end being connected to the retract port of one of said actuators.

3. The servoactuator of claim 2 wherein said static ports adjacent opposite ends of said rotatable sleeve are in axial alignment with each other, and said arcuate channels at opposite ends of said rotatable sleeve are angularly displaced from each other.

4. The servoactuator of claim 3 wherein the ends of said arcuate channels at one end of said rotatable sleeve overlap the ends of said arcuate channels at the opposite end of said rotatable sleeve.

5. The servoactuator of claim 1 further comprising a housing, said actuators being trunnion mounted on said housing for angular movement relative to said shaft.

6. The servoactuator of claim 5 further comprising a manifold mounted on said housing, said valve means being contained in said manifold.

7. The servoactuator of claim 1 further comprising means for controlling fluid flow to said means for sequencing, and means for providing electrical feedback position signals proportional to the angular position of said shaft.

8. The servoactuator of claim 1 wherein there is a pair of said actuators angularly arranged at an angle of approximately 90°, said actuators being trunnion mounted, and said trunnions containing internal porting to provide a fluid swivel between the respective ends of said actuators and said means for sequencing.

9. A servoactuator for controlled rotation of a crankshaft and the like comprising a plurality of angularly disposed actuators, means operatively connecting said actuators to said crankshaft for effecting rotation of said crankshaft in response to reciprocating movements of said actuators, and means for sequencing a source of high pressure fluid and return to the respective ends of said actuators, said means for sequencing comprising valve means driven by the rotary motion of said crankshaft, said valve means comprising a rotatable sleeve having arcuate channels at each end respectively communicating with a source of high pressure fluid and return, and static ports adjacent each end of said rotatable sleeve which sequentially communicate with said arcuate channels as said rotatable sleeve rotates thereby sequencing high pressure fluid and return to the respective ends of said actuators.

10. The servoactuator of claim 9 further comprising a valve shaft connected to said crankshaft for rotation thereby, said valve shaft being coaxially disposed within said rotatable sleeve and in driving engagement therewith for rotation of said rotatable sleeve by said valve shaft.

11. The servoactuator of claim 10 further comprising means for controlling fluid flow to said means for sequencing, and means for providing electrical feedback position signals proportional to the angular position of said crankshaft.

12. The servoactuator of claim 11 wherein said means for providing electrical feedback position signals comprises a rotary variable differential transformer, and drive means interconnecting said crankshaft and transformer to be driven thereby.

13. The servoactuator of claim 12 wherein said drive means comprises a gear drive between said valve shaft and said transformer.

14. The servoactuator of claim 13 wherein said transformer has an antibacklash gear mounted thereon in driving engagement with a pinion gear on said valve shaft.

15. A servoactuator system for providing 360° controlled rotation of an aircraft nose wheel steering system and the like comprising a pair of angularly disposed actuators, means operatively connecting said actuators to a shaft for effecting rotation of said shaft in response to reciprocating movements of said actuators, and means for sequencing a source of high pressure fluid and return to the respective ends of said actuators so that said actuators continuously develop output force except for end stroke points, said means for sequencing comprising valve means driven by the rotary motion of said shaft, said valve means comprising a rotatable sleeve having a pair of arcuate channels at each end respectively communicating with a source of high pressure fluid and return, and a pair of static ports adjacent each end of said rotatable sleeve, one of said static ports at each end being connected to the extend port of one of said actuators and the other of said static ports at each end being connected to the retract port of one of said actuators, said static ports sequentially communicating with said arcuate channels as said rotatable sleeve rotates thereby sequencing high pressure fluid and return to the respective ends of said actuators.

16. The system of claim 15 wherein said static ports adjacent opposite ends of said rotatable sleeve are in axial alignment with each other, and said arcuate channels at opposite ends of said rotatable sleeve are angularly displaced from each other with the ends of said arcuate channels at one end of said sleeve overlapping the ends of said arcuate channels at the opposite end of said sleeve.

17. The system of claim 15 further comprising a linear electro-hydraulic valve for controlling fluid flow to said means for sequencing.

18. The system of claim 15 further comprising a bypass damping valve upstream of said means for sequencing, said bypass damping valve being connected between a source of high pressure fluid and return, said bypass damping valve including a damping orifice, and means responsive to a loss in such high pressure fluid to direct fluid flow between the respective actuators through said damping orifice to provide shimmy damping in a power-off mode.

19. The system of claim 18 further comprising means for blocking such direct fluid flow between the respective actuators and for connecting the high pressure fluid and return to said means for sequencing for controlled operation of said system in a power-on mode.

20. The system of claim 15 further comprising means for maintaining sufficient fluid head to provide make-up fluid to the system as needed during contraction due to temperature decrease.

21. The system of claim 15 further comprising anti-cavitation valves connected between a source of high pressure fluid and return.

22. The system of claim 15 further comprising pressure relief valve means for directing actuator flow to return during any possible extreme backdriving condition.

23. The system of claim 22 further comprising a bypass damping valve upstream of said means for sequencing, said bypass damping valve being connected between a source of high pressure fluid and return, said bypass damping valve including a damping orifice, and means responsive to a loss in such high pressure fluid to direct fluid flow between the respective actuators through said damping orifice to provide shimmy damping in a power-off mode, said means for sequencing being connected to said pressure relief valve means through said bypass damping valve.

24. The system of claim 15 further comprising a pinion gear on said crankshaft operative to drive a torque collar gear.

25. A servoactuator for controlled rotation of a shaft comprising a housing, a pair of actuators mounted on said housing and arranged at an angle of approximately 90°, means operatively connecting said actuators to a shaft for effecting rotation of such shaft in response to reciprocating movement of said actuators, and valve means driven by the rotary motion of such shaft for sequentially simultaneously connecting a source of high pressure fluid and return with the ends of said actuators so that said actuators continuously develop output force except for the end stroke points whereby the required power is essentially constant when driving under a constant load at a constant rate, said valve means comprising a rotatable sleeve having arcuate channels at each end respectively communicating with a source of high pressure fluid and return, and static ports adjacent each end of said rotatable sleeve which sequentially communicate with said arcuate channels as said rotatable sleeve rotates thereby sequencing high pressure fluid and return to the respective ends of said actuators.

26. The servoactuator of claim 25 wherein said actuators are trunnion mounted in said housing, and the trunnions therefor contain internal porting to provide a fluid swivel between the respective ends of said actuators and said valve means.

* * * * *